United States Patent [19]

Shaffer

[11] Patent Number: 5,506,316
[45] Date of Patent: Apr. 9, 1996

[54] CARBOCATIONIC CATALYSTS AND PROCESS FOR USING SAID CATALYSTS

[75] Inventor: Timothy D. Shaffer, Dickinson, Tex.

[73] Assignee: Exxon Chemical Patents Inc., Wilmington, Del.

[21] Appl. No.: 335,011

[22] Filed: Nov. 7, 1994

Related U.S. Application Data

[63] Continuation-in-part of Ser. No. 242,568, May 13, 1994, which is a continuation-in-part of Ser. No. 44,529, Apr. 8, 1993, Pat. No. 5,350,819, which is a continuation-in-part of Ser. No. 20,850, Feb. 19, 1993, abandoned.

[51] Int. Cl.⁶ .............................. C08F 4/52; C08F 10/10
[52] U.S. Cl. ................ 526/185; 526/196; 526/348.7; 525/314; 525/319; 502/150; 502/152; 502/202; 502/203
[58] Field of Search ................... 526/189, 185, 526/196, 348.7, 236; 502/152, 202, 150, 203; 525/314, 319

[56] References Cited

U.S. PATENT DOCUMENTS

| | | |
|---|---|---|
| 4,276,394 | 6/1991 | Kennedy . |
| 4,278,822 | 7/1981 | Verstrate . |
| 4,910,321 | 3/1990 | Kennedy . |
| 4,929,683 | 5/1990 | Kennedy . |
| 4,946,899 | 8/1990 | Kennedy et al. . |
| 5,169,914 | 12/1992 | Kaszas . |
| 5,350,819 | 9/1994 | Shaffer .................... 526/189 |

FOREIGN PATENT DOCUMENTS

| | | |
|---|---|---|
| 1272547 | 8/1990 | Canada . |
| 0341012 | 11/1989 | European Pat. Off. . |
| 90/15081 | 12/1990 | WIPO . |

OTHER PUBLICATIONS

M. Gyor, et al. Polym. Prepr. Amer. Chem. Soc. 33(1) 158 (1992).

Kennedy, et al. "Carbocationic Polymerization in the Presence of Sterically Hindered Bases . . . " J. Macromol. Sci–Chem., A 18(1), pp. 119–128 (1982).

Living Cationic Polymerization of α–methyl Styrene, Matyjaszewski, et al.

Primary Examiner—Fred Teskin
Attorney, Agent, or Firm—Catherine L. Bell

[57] ABSTRACT

A living carbocationic catalyst composition comprising an initiator of a tertiary alkyl halide, a tertiary aralkyl halide or polymeric halide a co-initiator of a methylaluminum or methylboron compound, and a solvent medium with a dielectric constant between 2.5 and 7 is used to produce narrow molecular weight distribution polymers particularly isobutylene polymers.

26 Claims, 1 Drawing Sheet

CARBOCATIONIC CATALYSTS AND PROCESS FOR USING SAID CATALYSTS

CROSS-REFERENCE TO RELATED APPLICATIONS

This invention is a continuation-in-part of United States Ser. No. 08/242,568, filed May 13, 1994 which is a continuation-in-part of United States Ser. No. 08/044,529, filed Apr. 8, 1993, now U.S. Pat. No. 5,350,819 which is a continuation-in-part of United States Ser. No.08/020,850 filed Feb. 19, 1993, now abandoned.

FIELD OF THE INVENTION

This invention relates to living polymerization of olefins using catalysts comprising alkylaluminum halides or alkyl boron halides.

BACKGROUND OF THE INVENTION

A variety of cationic catalysts are known to produce polymers out of olefin monomers in living and nonliving polymerizations. In a living polymerization, each initiator molecule initiates a growing polymer chain that does not undergo chain transfer or termination reactions while monomer is present. In some of these systems once the monomer is depleted the growing polymer chain undergoes an irreversible termination reaction. In theory, though, if the chains did not terminate then addition of monomer would cause the polymer chain to grow regardless of the length of time between monomer additions. In reality however, this reversible termination has been difficult to produce as later monomer additions grow unevenly to produce a broad molecular weight distribution. Such a distribution is the hallmark of a non-living system. Thus a living and terminationless system has heretofore not been strictly attained. It is an object of this invention to provide such a terminationless living system.

Typical cationic catalysts such as titanium tetrachloride ($TiCl_4$), boron trichloride ($BCl_3$), tin tetrachloride($SnCl_4$), iron trichloride ($FeCl_3$), aluminum trichloride ($AlCl_3$) systems and the like have been described in U.S. Pat. Nos. 4,910,321 and 4,929,683, and European Patent Application 341 012 for use in the living polymerization of olefins. The basic components of these systems include a Lewis acid, a tertiary alkyl initiator molecule containing a halogen, ester, ether, acid or alcohol group and an electron donor molecule such as ethyl acetate. The exact combination of the elements varies with each system. The tertiary alkyl initiators used in these systems are used for living and non-living carbocationic catalysts. The tertiary alkyl initiators are typically represented by the formula:

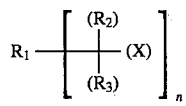

wherein $R_1$, $R_2$, and $R_3$ are a variety of alkyl or aromatic groups or combinations thereof, n is the number of initiator molecules, typically 1 to 6, and X is the functional group which the Lewis acid ionizes to bring about the carbocationic initiating site. This group is typically a halogen, ester, ether, alcohol or acid group depending on the Lewis acid employed. One or two functional groups per initiator tend to lead to linear polymers while three or more tend to lead to star polymers.

As discussed in U.S. Pat. No. 5,169,914, the chosen electron pair donor component of these systems directly relates to the ability of these catalysts to stabilize the carbocation formed and to generate living conditions. Electron pair donors have been defined as molecules capable of donating electron density to an electron deficient site. These molecules usually contain heteroatoms and heteroatomic functional groups including amides, ester, ethers, sulfoxides and the like. The electron donor number concept has been used to explain the activity of early catalyst systems which employ ether and ester initiators. It was believed that the formation of in situ electron pair donors were responsible for the catalyst characteristics. However, the role of the electron donor is still uncertain and has been challenged. See M Gyor, H. C. Wang, R. Faust, J. Macromol. Sci. A29, 639 (1992).

Catalyst systems based on boron trichloride and titanium tetrachloride using various combinations of the above components typically have similar process characteristics. First, Lewis acid concentrations must exceed the concentration of initiator sites by 16 to 40 times in order to achieve 100 percent conversion in 30 minutes (based upon a degree of polymerization equal to 890) at −75° to −80° C. These catalyst systems are also typically used with solvents. For example, the references above disclose methyl chloride as a preferred solvent and that a mixed solvent may be used to avoid side reactions or to keep the polymer in solution. Further the mixed solvent should provide some degree of polarity to maintain the polymerization rate. However, even in these circumstances, an electron pair donor must be present.

For an industrially applicable process these catalysts and polymerization conditions fall short of commercial usefulness. Improvements in these systems would include elimination of boron and titanium based Lewis acids as they present handling and purification problems. In addition, living systems also tend to require expensive proton scavengers to suppress initiation from unwanted protons, such as those from water contamination. In a preferred embodiment, this invention also provides a system that achieves living polymerization in the absence of a proton scavenger or an electron donor pair.

SUMMARY OF THE INVENTION

In accordance with this invention, there is provided a living carbocationic polymerization catalyst system comprising an initiator of one of a tertiary alkyl halide, a tertiary aralkyl halide or a tertiary polymeric halide, wherein each alkyl is independently a straight or branched chain alkyl and each aralkyl is substituted or unsubstituted, a co-initiator of a methylaluminum or a methylboron compound, and a solvent medium having a dielectric constant between about 2.5 and about 7. Another aspect of the invention comprises a process of using this catalyst system for the polymerization of olefins and for producing narrow molecular weight distribution polymers.

DESCRIPTION OF PREFERRED EMBODIMENTS

Figure 1:
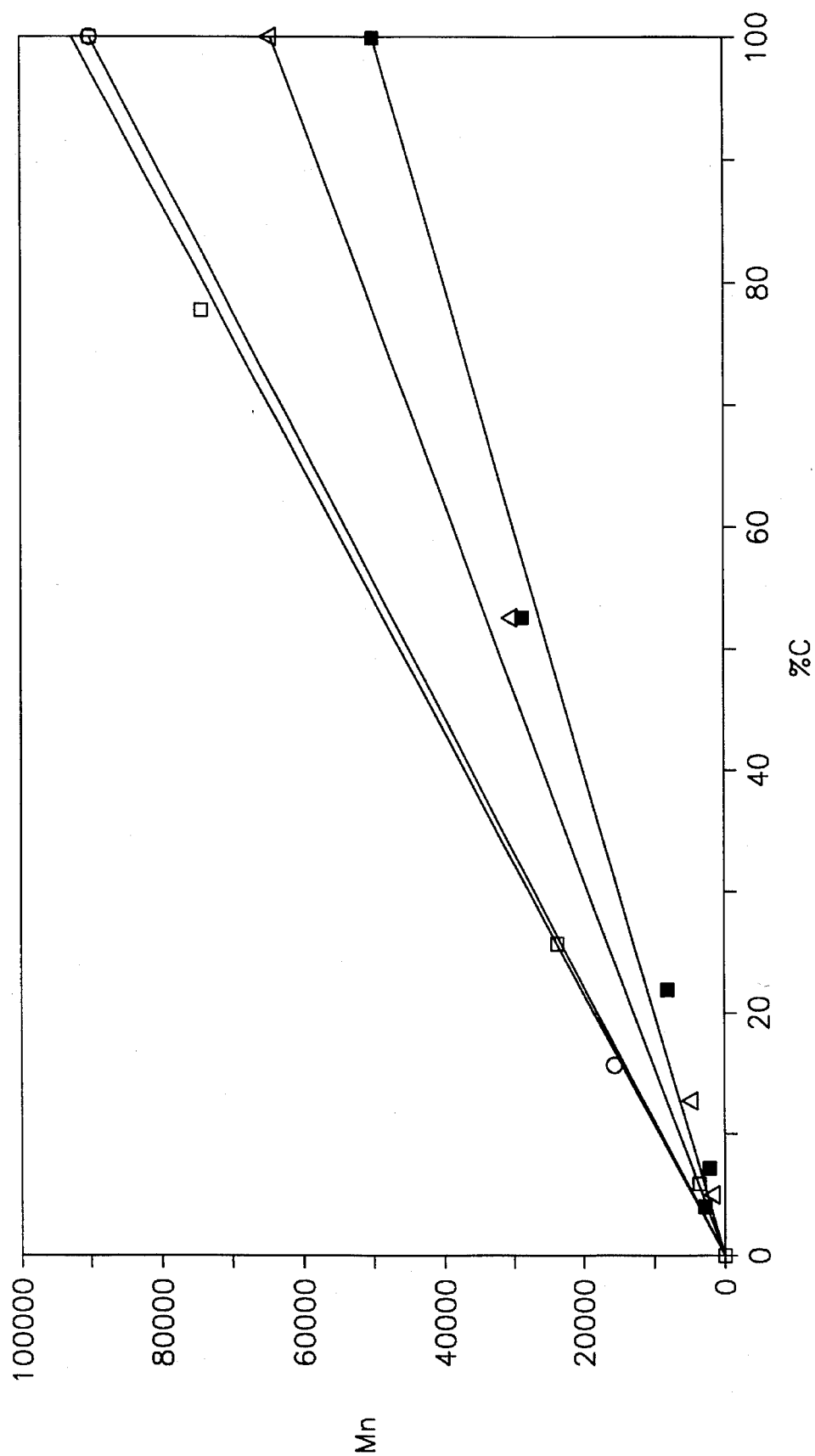
FIG. 1 is a plot of the Mn vs. conversion (% C) for living isobutylene polymerizations at varied dimethylaluminum chloride concentrations.

This invention relates to a living carbocationic polymerization catalyst composition and process based upon a catalyst composition comprising: (1) an initiator of a tertiary alkyl halide, a tertiary aralkyl halide or a tertiary polymeric halide, wherein each alkyl group is independently a straight or branched chain alkyl, preferably containing 1 to 15 carbon atoms, each aralkyl is substituted or unsubstituted and wherein the polymeric unit is an olefin polymer; (2) a co-initiator of a methylaluminum or a methylboron compound; and (3) a solvent medium with a dielectric constant between about 2.5 and about 7.

In a preferred embodiment, this invention provides a living carbocationic polymerization catalyst composition and process based upon a catalyst composition comprising: (1) an initiator of a tertiary alkyl halide, a tertiary aralkyl halide or a tertiary polymeric halide, wherein each alkyl group is independently a straight or branched chain alkyl, preferably containing 1 to 15 carbon atoms, each aralkyl is substituted or unsubstituted and wherein the polymeric unit is an olefin polymer; (2) a co-initiator of dimethylaluminum halide or dimethylboron halide, preferably dimethylaluminum chloride; and (3) a solvent medium with a dielectric constant between about 2.0 and about 7 (as measured at 20° C.) and having a water content of about $1 \times 10^{-3}$ mol/l or less. Either the monomer or the co-initiator may be added last. However if the monomer is to be added last, it is preferred that an aging period of about three to about twenty minutes be utilized prior to the addition of the monomer. The addition of the last component begins the polymerization. Mn may be preselected by controlling the ratio of monomer to initiator concentrations, as in other living polymerization systems. In one embodiment, to make high Mn copolymers, the initiator concentration is typically about $1 \times 10^{-3}$ mol/l or less; the monomer concentration is typically 1 to 3 mol/l, and the initiator and co-initiator are typically present at a molar ratio of 0.1 or more, preferably about 0.1 to about 20 (co-initiator to initiator).

The catalyst systems described herein can be used, among other things, for the polymerization of olefins, particularly the polymerization of one or more olefinic, α-olefinic, di-substituted olefinic or styrenic monomers. Monomers which may be polymerized by this system include any hydrocarbon monomer that is cationically polymerizable, i.e. capable of stabilizing a cation or propagating center because the monomer contains an electron donating group. Preferred monomers include one more of olefins, α-olefins, disubstituted olefins, isoolefins, styrenics and/or substituted styrenics. Preferably, the monomer contains 1 to 20 carbon atoms, more preferably 1 to 8, even more preferably 2 to 6 carbon atoms. Examples of preferred olefins include styrene, para-alkylstyrene, para-methylstyrene, alpha-methyl styrene, isobutylene, 2-methylbutene, 2-methylpentene, isoprene, butadiene and the like. A particularly preferred monomer combination comprises isobutylene and para-methyl styrene. The system has the benefit of producing polymers with narrow molecular weight distribution, particularly narrow molecular weight distribution polyisobutylene that can incorporate additional monomer and still maintain a narrow molecular weight distribution.

Preferred initiators include tertiary alkyl or aralkyl halides represented by the formula below:

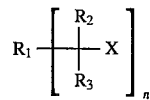

wherein X is a halogen, preferably chloride and $R_1$, $R_2$ and $R_3$ are independently any straight or branched chain alkyls, aryls or aralkyls, preferably containing 1 to 15 carbon atoms, more preferably 1 to 8 carbon atoms, even more preferably 1 to 2 carbon atoms. n is the number of initiator sites and is a number greater than or equal to 1, preferably 1 to 6. The aralkyls may be substituted or unsubstituted. Preferred examples include 2-chloro-2,4,4-trimethyl pentane (TMPC1), 1,3,5 tri (1-chloro-1-methyl ethyl) benzene and 5-tert-butyl- 1,3-di(1-chloro-1-methyl ethyl) benzene (TBDCC). Other suitable initiators can be found in U.S. Pat. No. 4,946,899, which is herein incorporated by reference. For the purposes of this invention and any claims thereto, aralkyl is defined to mean a compound containing both aromatic and aliphatic structures.

Another preferred initiator is a tertiary polymeric halide, one of $R_1$, $R_2$ or $R_3$ is an olefin polymer and the remaining R groups are defined as above. Preferred olefin polymers include polyisobutylene and polypropylene. The polymeric initiator may have halogenated tertiary carbon positioned at the chain end or along or within the backbone of the polymer. When the olefin polymer has multiple halogen atoms at tertiary carbons, either pendant to or within the polymer backbone, the product polymer may have a comb like structure and/or side chain branching depending on the number and placement of the halogen atoms in the olefin polymer. Likewise, the use of a chain end tertiary polymeric halide initiator provides a method for producing block copolymers. Monomer added to the polymeric initiator will form a second block. Successive blocks can be formed by sequential monomer addition.

The preferred co-initiator is a dimethylaluminum halide or dimethylboron halide, preferably dimethylaluminum chloride or dimethylboron chloride.

The solvent medium can be a single solvent or a mixture of solvents such that: (1) the polarity has been adjusted to match or resemble that obtained from a solvent mixture of 30 to 90 parts methyl cyclohexane to 70 to 10 parts methylene chloride, by volume; (2) has a calculated dielectric constant of between about 2.5 and about 7 units; or (3) has a measured dielectric constant between about 2.5 and about 7 plus or minus ten percent error. If the preferred embodiment utilizing dimethylaluminum halide as a co-initiator is selected then the dielectric constant is preferably from about 2 to about 7 plus or minus ten percent error.

The dielectric constant is calculated or measured by the methods described in PCT publication WO 94/19380, published Sep. 1, 1994,(which claims priority from U.S. Ser. No. 08/020,850 and U.S. Ser. No. 08/044,529), all of which are incorporated by reference herein for the purposes of U.S. law.

Suitable solvents include hydrocarbons, especially hexanes and heptanes, halogenated hydrocarbons, especially chlorinated hydrocarbons and the like. Specific examples include but are not limited to methyl cyclohexane, ethyl cyclohexane, propyl cyclohexane, methyl chloride, methylene chloride, ethyl chloride, propyl chloride, butyl chloride, chloroform and the like.

For the purposes of this invention and the claims thereto a proton scavenger is defined to be a composition capable of reacting irreversibly with free protons and not producing a new species of catalyst or if it does produce a new species of catalyst, that catalyst is substantially inactive when compared to the catalyst system of this invention. This invention is preferably used in the absence of proton scavenger.

The co-initiator is preferably present in the polymerization feed at a mol ratio of up to about 20 times the number of initiator sites, preferably about 0.001 to about 20 times the number of initiator sites, even more preferably about 0.5 to about 8 times the number of initiator sites. In a preferred embodiment using dimethylaluminum halide as a co-initiator without the presence of a proton trap, the co-initiator may be present in a coinitiator:initiator ratio of about 0.1:1 or more, preferably a ratio of 0.1:1 of about 20:1 or more.

The concentration of the water in the system is calculated by the method described in PCT publication WO 94/19380 or measured by other means known in the art. This value is calculated for a batch of dried solvent or solvent mixture and then the value is used when that solvent is the reaction media. For the purposes of this invention it is assumed that the concentration of water in a given system of the same solvent batch does not vary in a statistically significant manner. (Even though the exact concentration may vary, the concentration is usually between $10^{-3}$ a to $10^{-4}$ M.)

The polymerization reaction is typically run at or below about $-30°$ C. preferably below about $-75°$ C. Typical monomers which may be polymerized by this system include one or more of: olefins, alpha olefins or disubstituted olefins. Preferred monomers include isobutylene, 2-methylbutene, 2-methyl-pentene, and the like. The polymerization is typically performed in a solution phase reactor by methods known in the art. The polymerization is typically complete in about 10 minutes, however, may run from less than one minute to about an hour. However, longer polymerization times are still within the scope of this invention.

The polymers produced by this invention have a narrow molecular weight distribution (Mw/Mn), preferably less than about 2.0, even more preferably less than about 1.75. Polyisobutylene and other isobutylene based polymers having a narrow molecular weight distribution are preferred polymers produced by this catalyst system. Furthermore, when tertiary polymeric halide initiators with the tertiary carbon at the chain end or along or with in the polymer backbone are used, block copolymers and/or polymers with one or more side chain branches including comb copolymers are produced, respectively.

EXAMPLES

For the examples of this invention, the method described above was used to calculate the concentration of water in the solvents. For all the examples it is assumed that the water concentration was less than $1.0 \times 10^{-4}$ mol/l. Once this concentration was determined above solvents from the same batch of dried solvents were used so as to minimize any variation in water concentration.

Molecular weight (Mw and Mn) were measured by Gel Permeation Chromotography using a Waters 150 gel permeation chromatograph equipped with a differential refractive index (DRI) detector. The numerical analyses were performed using the commercially available standard Gel Permeation Software package.

EXAMPLE 1:

In a nitrogen box having a water content below about 5 ppm, a test tube was charged with 3 microliters of 2-chloro-2,4,4-trimethylpentane (TMPCl), 4 ml of anhydrous methylene chloride, 6 ml of anhydrous hexane and 1.6 grams of isobutylene at $-80°$ C. Once the solution stabilized at $-80°$ C., 100 microliters of a 2.57M solution of dimethylaluminum chloride in methylene chloride was added to begin the polymerization. After 25 minutes the polymerization was stopped with the addition of 3 ml of chilled methanol. Polymer was isolated by pouring the reaction mixture into methanol with stirring. The data are reported in Table 1, Table 2 and FIG. 1.

TABLE 1

| Run | [DMAC] (mol/l) | [TMPCl] (mol/l) | [Ib] (mol/l) | |
|---|---|---|---|---|
| 1 (■) | $1.28 \times 10^{-2}$ | $1.57 \times 10^{-3}$ | 1.4 | $447.69 + 504.27 \times$ $R^2 = 0.994$ |
| 2 (-▲-) | $1.28 \times 10^{-2}$ | $1.98 \times 10^{-3}$ | 2.3 | $1749 + 669.95 \times$ $R^2 = 0.997$ |
| 3 (-□-) | $2.57 \times 10^{-2}$ | $1.98 \times 10^{-3}$ | 3.2 | $336.38 + 937.53 \times$ $R^2 = 0.998$ |
| 4 (-○-) | $3.85 \times 10^{-2}$ | $1.98 \times 10^{-3}$ | 3.2 | $590.5 + 904.97 \times$ $R^2 = 1.000$ |

Ib = isobutylene;
TMPCl = 2-chloro-2,4,4-trimethylpentane.

TABLE 2

| Run | % C (-■-) | Mn (-■-) | % C (-▲-) | Mn (-▲-) | % C (-□-) | Mn (-□-) | % C (-○-) | Mn (-○-) |
|---|---|---|---|---|---|---|---|---|
| 1 | 0 | 0 | 0 | 0 | 0 | 0 | 0 | 0 |
| 2 | 7 | 2311 | 4 | 1441 | 5 | 2995 | 16 | 15773 |
| 3 | 4 | 2626 | 13 | 5347 | 26 | 24639 | 100 | 15773 |
| 4 | 22 | 8398 | 53 | 31981 | 78 | 75101 | | |
| 5 | 53 | 28425 | 100 | 66377 | 100 | 91526 | | |
| 6 | 100 | 49348 | | | | | | |

% C = percent conversion.

All references, testing procedures and priority documents are incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby.

I claim:

1. A carbocationic catalyst composition, free of added proton scavenger, comprising:

an initiator represented by the formula;

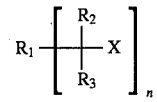

wherein $R_1$, $R_2$ and $R_3$ are independently a $C_1$ to $C_{15}$ straight or branched chain alkyl, aryl or aralkyl group, X is a halogen and n is a number greater than or equal to 1;

a co-initiator which is one of a methylaluminum or a methylboron compound; and a solvent medium having a dielectric constant between about 2.5 and about 7.

2. The carbocationic catalyst composition of claim 1 wherein the co-initiator is dimethylaluminum halide.

3. The carbocationic catalyst composition of claim 1, wherein the co-initiator is dimethylboron halide.

4. The carbocationic catalyst composition of claim 1 wherein the co-initiator is dimethylaluminum chloride.

5. The carbocationic catalyst composition of claim 1 wherein each alkyl or aralkyl group of the initiator has 1 to 8 carbon atoms.

6. The carbocationic catalyst composition of claim 5 wherein each alkyl group has 1 or 2 carbon atoms.

7. The carbocationic catalyst composition of claim 1 wherein n is a 1 to 6.

8. The carbocationic catalyst composition of claim 1 wherein the ratio of number of moles of co-initiator to the number of initiator sites is up to about 20:1.

9. The carbocationic catalyst composition of claim 1 wherein the ratio of number of moles of co-initiator to the number of initiator sites 0.001:1 to about 20:1.

10. The carbocationic catalyst composition of claim 1 wherein the ratio of number of moles of coinitiator to the number of initiator sites is from about 0.5:1 to about 8:1.

11. A polymerization process comprising contacting under polymerization conditions one or more olefinic, alpha olefinic, di-substituted olefinic or styrenic monomers with a catalyst composition, free of added proton scavenger comprising:

an initiator of represented by the formula;

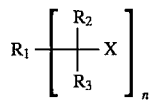

wherein $R_1$, $R_2$ and $R_3$ are independently $C_1$ to $C_{15}$ straight or branched chain alkyls, aryls or aralkyls, X is a halogen and n is a number from 1 to 6;

a co-initiator of a methylaluminum or methylboron compound; and a solvent medium with a dielectric constant between 2.5 and 7.

12. The process of claim 11 wherein the polymerization is conducted at a temperature at or below about −30° C.

13. The process of claim 11 wherein the polymerization is conducted at a temperature at or below about −70° C.

14. The process of claim 11 wherein the ratio of the number of moles of co-initiator to the number of initiator sites is between about 0.001:1 to about 20:1.

15. The process of claim 11 wherein the co-initiator is a dimethylaluminum halide.

16. The process of claim 11 wherein the co-initiator is dimethylaluminum chloride, and in the initiator formula each alkyl or aralkyl independently has 1 to 8 carbon atoms.

17. The process of claim 11 wherein the monomer comprises isobutylene.

18. A carbocationic catalyst composition comprising:

an initiator of one of a tertiary alkyl halide, a tertiary aralkyl halide or a tertiary polymeric halide;

a co-initiator which is one of a dimethylaluminum halide or a dimethylboron halide; and a solvent medium having a dielectric constant between about 2.0 and about 7 and having a water content of about $1 \times 10^{-3}$ mol/l or less.

19. The composition of claim 18 wherein the molar concentration ratio of co-initiator to initiator is 0.1:1 or more.

20. The composition of claim 19 wherein the molar concentration ratio of co-initiator to initiator is between about 0.1:1 to about 20:1.

21. A living polymerization process comprising: contacting under polymerization conditions one or more olefinic, α-olefinic, di-substituted olefinic or styrenic monomers with a catalyst composition comprising:

an initiator of a tertiary alkyl halide, tertiary aralkyl halide or tertiary polymeric halide;

a co-initiator of an dimethylaluminum halide or dimethylboron halide; and a solvent medium with a dielectric constant between 2.0 and 7 having a water content of about $1 \times 10^{-3}$ mol/l or less.

22. The process of claim 21 wherein the monomer is added to a solution of initiator, co-initiator and solvent at least about 3 minutes after the addition of the co-initiator.

23. The process of claim 21 wherein the polymerization is conducted at a temperature at or below about −30° C.

24. The process of claim 21 wherein the polymerization is conducted at a temperature at or below about −70° C.

25. The process of claim 21 wherein the ratio of the number of moles of co-initiator to the number of initiator sites is between about 0.01:1 to about 20:1.

26. The process of claim 21 wherein the co-initiator is dimethylaluminum chloride.

* * * * *